United States Patent Office 2,927,464
Patented Mar. 8, 1960

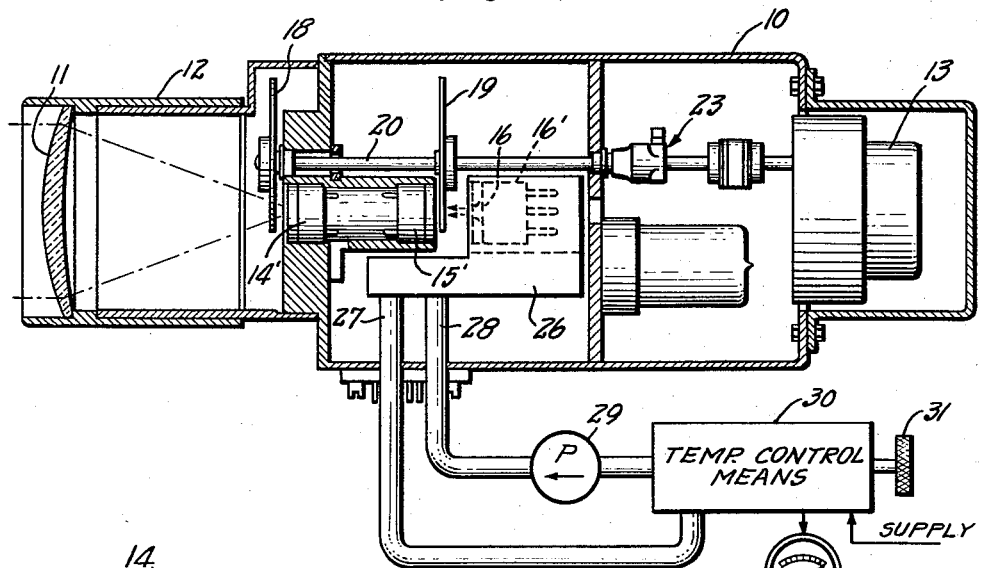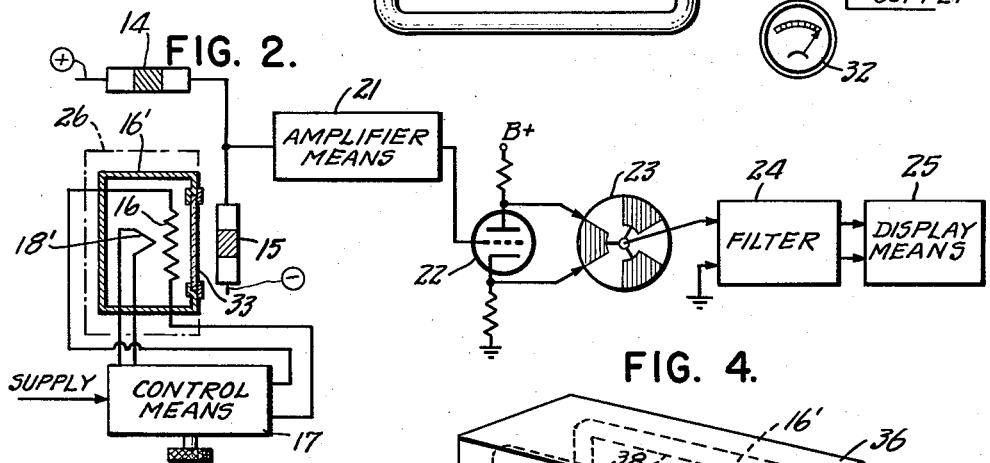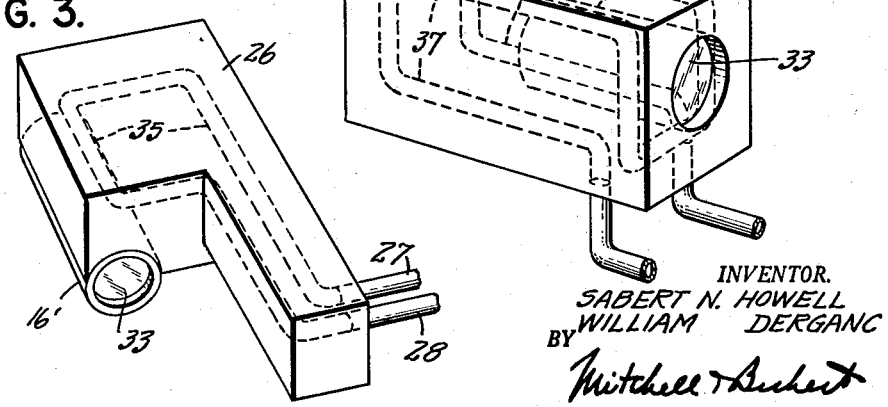

2,927,464

PYROMETER

Sabert N. Howell, Huntington, and William Derganc, Centerport, N.Y., assignors to Servo Corporation of America, New Hyde Park, N.Y., a corporation of New York Application January 16, 1956, Serial No. 559,347

5 Claims. (Cl. 73—355)

Our invention relates to an improved radiation-pyrometer construction and incorporates refinements over the construction disclosed in copending patent application Serial Number 481,124, filed January 11, 1955.

It is an object of the invention to provide an improved device of the character indicated.

It is another object to provide a more compact, rugged and reliable optical pyrometer for continuously following electrical signals reflecting optically collected thermal energy.

It is a specific object to provide a pyrometer meeting the above objects and characterized by extended range of thermal response, particularly for temperatures below ambient.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a simplified, longitudinal sectional view through a radiation pyrometer incorporating features of the invention, together with a schematic showing of certain control elements therefor;

Fig. 2 is an electrical diagram schematically showing connections to the pyrometer of Fig. 1; and Figs. 3 and 4 are simplified diagrammatic, isometric views of alternative cooling mechanisms for the pyrometer of Fig. 1.

Briefly stated, our invention contemplates application to radiation pyrometers of the type disclosed in said copending application. Such pyrometers employ two energy-responsive elements, one of which is continuously exposed to a reference source, and the other of which is continuously exposed to the unknown source to be evaluated. The reference source may be contained within a capsule and may include an electrical heating element automatically regulated by thermostatic means. It is in the nature of such devices that the range of regulation is definitely limited, so that, for any particular instrument, observations on an unknown source must be made against reference-source conditions that are fairly limited as to range of reference temperature.

In our invention, we provide a heat-exchanger mechanism in intimate contact with the reference-source capsule, and the heat-sensing device of the reference source responds differentially to the capsule temperature and to the radiation of the heater element, so that the thermally-controlled range of operation may be based not on ambient temperature but rather on whatever temperature is provided by the heat-exchanger mechanism. The invention is particularly useful in situations requiring reference temperatures near or below ambient, and in that event, the heat exchanger is a cooling device which may be supplied with a continuous flow of cooling fluid, the temperature of which may be regulated externally of the pyrometer.

Referring to Fig. 1 of the drawings, our invention is shown in application to a pyrometer contained within a generally cylindrical housing 10 having a predominant elongated axis. Collecting optics in the form of an infrared-transmitting lens 11, as of arsenic trisulphide glass, may be adjustably mounted in a barrel 12 on the axis of the housing 10 at one end thereof. Motor means 13 for driving mechanical parts may be contained within a suitably vented rear part of the assembly, the latter being again preferably located on the same predominant longitudinal axis on the assembly.

The detector assembly may comprise two radiation-responsive elements 14—15, shown contained within separate capsules 14'—15'. The element within the first capsule 14' is mounted at the focus of the optics 11, and the element 15 within capsule 15' is in shielded relation to the energy collected by optics 11 and is exposed only to reference radiation from a source 16 contained within a source capsule 16'. The source 16 may be an electrical heater element continuously supplied by means 17 and regulated by thermostatic means, such as a bead thermistor 18' within capsule 16' and adjacent the element 16; the means 18' will be understood to respond differentially to the temperature of the capsule 16' and to the temperature of the heater 16.

In the form shown, separate choppers 18—19 are mounted on the same shaft 20 and are driven by motor 13 so as simultaneously to expose elements 14—15 and then simultaneously to cut off elements 14—15 from their respective sources of radiation. As explained more fully in said application, Ser. No. 481,124, the outputs of the two detectors 14—15 may be differentially evaluated by amplifier means 21 and supplied to a phase splitter 22. A D.-C. output signal is available by subjecting the split-phase signals to synchronous rectification at 23, and to suitable filtering at 24, before recording or displaying at 25.

In accordance with the invention, the effective range of operation of the instrument is extended by providing means whereby the reference source may be regulated over a substantially increased range of temperatures. This result is achieved by means of a heat-exchanger mechanism, designated generally 26 in Figs. 1 and 2, and substantially enveloping the source capsule 16'. The heat exchanger 26 may be a block of heat-conducting material, such as copper, having a plurality of fluid-circulating passages terminated at inlet and outlet connections 27—28, extending externally of the housing 10. In Fig. 1, we show pump means 29 for continuously circulating coolant or other heat-exchanger fluid in the supply system 27—28, and means 30 for automatically regulating the temperature of such coolant; coolant temperature may be regulated by manual means 31 and observed at an external meter 32.

The particular capsule 16' employed in the pyrometer shown in Fig. 1 is of cylindrical configuration, with an opening or window 33 (Fig. 2) at one end thereof. For protection of the element 16, we prefer that the opening be closed by suitably transparent means, and we have shown a window element 33 of radiation transmitting material, such as arsenic-trisulphide glass. The heat-exchanger unit 26 shown in Fig. 3 envelopes a substantial fraction of the cylindrical periphery of the capsule 16' and includes circulatory passages, designated generally 35, for achieving substantially uniform temperature throughout block 26. In Fig. 4 on the other hand, the heat exchanger 36 fully envelopes all parts of the capsule 16' except for the window opening 33 thereof, and cooling passages 37—38 substantially symmetrically surround the capsule 16' so as to assure utmost uniformity of temperature in the heat-exchanger block 36. Whatever the configuration of the heat-exchanger device, the reference element 15 will be understood to respond to a reference temperature representing a definite value intermediate that of the capsule 16′ and that of the heater 16.

It will be appreciated that we have disclosed a relatively simple but significant improvement in radiation pyrometers of the character indicated. By using an externally regulated supply of coolant or other heat-exchanger fluid, we make possible the establishment of reference-source temperatures extending over a very substantially increased range beyond those accommodatable by an electrically heated source alone. This improvement is particularly useful in the measurement of temperatures near and below ambient, and the improvement may be embodied in existing structures without substantial modification.

While we have disclosed our invention in detail for the preferred forms shown, it will be understood that modifications may be made within the scope of the invention as defined in the claims which follow.

We claim:

1. An optical pyrometer, comprising two like infrared responsive electrical elements; a reference infrared heat source in optical alignment with one of said elements; collecting optics for collecting energy from an unknown source and focusing the same on the other of said elements; a mechanical chopper; means for continuously driving said chopper so as to simultaneously expose said first element to said reference source and said second element to the unknown source and, in alternation with such exposure, to simultaneously cut off said elements from said respective sources; means responsive to the outputs of said elements for producing a signal corresponding to the difference between said outputs, whereby the difference signal is an indication of the temperature of said unknown source; a liquid heat-exchanger element for said reference source and including inlet and outlet fluid connections extending externally of said pyrometer; and means for establishing a temperature-controlled flow of fluid to said heat-exchanger element by way of said connections whereby the range of temperature measurement may be extended.

2. An optical pyrometer, comprising two like infrared responsive electrical elements, a reference infrared source in direct optical alignment with one of said elements collecting optics for focusing energy from an unknown source on the other of said elements, a liquid-circulating heat-exchanger device in intimate heat-transferring relation with said reference source, means establishing a continuous temperature-controlled flow of fluid to said device, and automatic electrical control means for said reference source, said control means being differentially responsive to the temperature of said heat-exchanger device and to the temperature of said reference source whereby the effective range of control of temperature of said reference source may be substantially extended beyond that available solely through direct electrical control thereof.

3. An optical pyrometer, comprising two like thermally responsive electrical elements, a reference source in optical alignment with one of said elements, collecting optics for collecting energy from an unknown source and focusing the same on the other of said elements, said reference source comprising a capsule containing an electrical heater element and means supplying electrical energy thereto, a heat-responsive electrical element within said capsule and disposed for response differentially to the temperature of said capsule and to the temperature of said heater element, said heater element being in controlling relation with the electrical energy supplied to said heater element, a liquid cooling device embracing said capsule and in heat-transferring relation therewith, and means continuously supplying a flow of temperature-regulated fluid to said cooling device.

4. A pyrometer according to claim 3, in which said capsule is an elongated, cylindrical configuration having an opening at one end thereof, said opening being exposed to said one element, and in which said cooling device envelopes a substantial fraction of the cylindrical periphery of said capsule.

5. A pyrometer according to claim 3, in which said capsule is an elongated, cylindrical configuration having an opening at one end thereof, said opening being exposed to said one element, and in which said cooling device envelopes the entire cylindrical periphery of said capsule.

References Cited in the file of this patent
UNITED STATES PATENTS

| | | |
|---|---|---|
| 1,630,056 | Buttolph | May 24, 1927 |
| 1,716,775 | Hayes | June 11, 1929 |
| 1,895,887 | Lorenz | Jan. 31, 1933 |
| 2,562,538 | Dyer | July 31, 1951 |
| 2,650,307 | Koppius | Aug. 25, 1953 |
| 2,665,129 | Durbin et al. | Jan. 5, 1954 |
| 2,683,794 | Briggs et al. | July 13, 1954 |
| 2,761,072 | Wormser | Aug. 28, 1956 |

FOREIGN PATENTS

| | | |
|---|---|---|
| 950,577 | France | Mar. 28, 1949 |
| 726,581 | Great Britain | Mar. 23, 1955 |